United States Patent [19]

Tsukamoto

[11] Patent Number: 4,966,554
[45] Date of Patent: Oct. 30, 1990

[54] APPARATUS AND METHOD FOR PASSING A CONTINUOUS CONDUIT THROUGH A ROTATABLE MEMBER

[75] Inventor: Yashuhiro Tsukamoto, Patchogue, N.Y.

[73] Assignee: Izumi Corporation, Patchogue, N.Y.

[21] Appl. No.: 434,365

[22] Filed: Nov. 13, 1989

[51] Int. Cl.[5] ............................................. H01R 35/04
[52] U.S. Cl. ....................................... 439/15; 439/164; 242/47
[58] Field of Search ........................ 439/4, 15, 164, 501, 439/13; 74/484 R; 242/47, 47.5; 191/12 R, 12.2 R; 280/731, 779

[56] References Cited

U.S. PATENT DOCUMENTS 4,808,146  2/1989  Nogami ................................. 74/492

Primary Examiner—Gary F. Paumen
Attorney, Agent, or Firm—Stephen E. Feldman

[57] ABSTRACT

A continous cable is passed through a rotatable member which has axially adjacent non-rotatable members on both sides of the rotatable member. The continuous cable is coiled around one non-rotatable or stationary member, passed over deflectors mounted on and rotatable with the rotating member, passed through an opening in the rotatable member to a second non-rotatable member and is coiled around the second non-rotatable or stationary member. As the rotatable member rotates, the deflectors transfer the cable linearly from one coil to the other coil across the rotatable member, that is, through the opening thus maintaining continuity in the cable.

26 Claims, 2 Drawing Sheets

APPARATUS AND METHOD FOR PASSING A CONTINUOUS CONDUIT THROUGH A ROTATABLE MEMBER

BACKGROUND OF THE INVENTION

1. Field of the Invention

The present invention relates to wiring techniques and systems, particularly where a wire forming an electrical path for carrying electric power, or a group of such wires, pass from a substantially stationary member through a rotatable member and continue to another substantially stationary member. The invention has particular utility where an electric wire or group of electric wires pass through a rotatable member which has limited rotational travel, such as the steering wheel of a motor vehicle, for example.

2. Prior Art

The passage of a wire or group of wires, sometimes referred to as a harness, carrying electric current through a rotatable member without interrupting the continuity of the electrical path, has been addressed and a solution to the problem generated by such structure has been presented, one solution to the problem lies in the use of a combination of conductive pins mounted in an insulated mounting and a plate with a conductive track on the plate. The conductive pins and the plate are mounted in such a manner so as to accord electrical contact between the conductive pins and the conductive track while the pins and the track move relative to each other.

The conventional steering wheel of a motor vehicle offers a good example of apparatus which has the type of problem involved. As represented in the drawings, and labeled Prior Art, it has been long standing practice to locate the horn button or horn switch for a motor vehicle on the upper or top side of the steering wheel of the vehicle, for the convenience of the driver of the vehicle. The steering wheel is mounted at one end a steering shaft which, at its other end, connects to the steering mechanism of the vehicle. The steering wheel is conventionally mounted on the steering shaft above a steering column, which surrounds the steering shaft. The steering wheel and steering shaft are rotatable while the steering column is stationary. The steering wheel and steering shaft are rotated in unison both clockwise and counterclockwise, for steering the vehicle to the left and right while the surrounding steering column remains stationary. The rotational travel of a steering wheel and shaft is normally no more than two full turns in both directions, from straight ahead steering.

In the past, a horn button or switch was located on the steering wheel with a single conductor such as a wire, extending from the horn button. The wire extended from the rotatable steering wheel to the stationary steering column. With a single conductor or wire, the wire could be loosely draped or wrapped or coiled around the steering shaft so that the wire would tighten and loosen about the shaft as the steering wheel and shaft were rotated. With a single wire connecting the rotatably moving horn button with a stationary terminal on the steering column and the limited rotational travel of the steering wheel, steering shaft and the horn button, a complex interconnect was not required.

As more features were added to motor vehicles, such as cruise control and audio systems, for example, additional buttons or switches were added to the motor vehicle to control the additional features.

It became desirable to locate some of these additional control buttons or switches in the hub of the steering wheel for driver or operator convenience.

With the additional buttons or switches located in the hub of the steering wheel it became desirable to arrest the hub of the steering wheel so as to place the hub of the steering wheel in a non-rotation state, irrespective of the rotation of the steering wheel. U.S. Pat. No. 4,808,146 teaches apparatus for generating the non-rotation state of the hub of a steering wheel irrespective of the rotational travel of the steering wheel in which the arrested hub is located.

The increase in the number of buttons or switches located in the hub of the steering wheel increased the number of wires threaded around the steering shaft and it was no longer practical to loosely wind the wires around the steering shaft, from the standpoint of wear on the wires and economy. The wire harness, now being much larger in diameter and heavier in weight, would wear faster and the many loose turns of wire around the steering shaft would be a cost factor.

This problem was overcome by the use of a combination or an interconnect of a plate with a plurality of conductive, isolated tracks and a set of condutive, isolated pins riding on the conductive tracks.

However, with the introduction of apparatus for arresting the hub in the steering wheel for holding the hub in a non-rotation state while the steering wheel is rotated, another set of conductive, isolated pins was added to the electrical interconnect apparatus and another set of conductive, isolated tracks was added to the plate. This decreased the reliability of the electrical interconnect apparatus and further increased the cost of the interconnect apparatus.

SUMMARY OF THE INVENTION

The present invention overcomes the problem of reliability of the prior art interconnect by eliminating the electrical interconnect structure and providing a solid electrical path that passes through a rotation member without physical interference with the physical continuity of the hard wire electric line.

Where a motor vehicle steering assembly includes an upper non-rotation member, located in the hub area of a rotation member, such as a steering wheel, and a lower non-rotation member, such as a steering column which surrounds a steering shaft extending from a steering wheel, wires, forming an electrical path that are connected to switches that are located in or on the upper non-rotation member, are secured to the non-rotatioin member at a point close to the switch or switches to which the wire or wires are connected. The wire or wires are coiled around the non-rotation member several times in a close but loosely fitted continuing spiral toward the rotation member. The wire or harness passes through an opening near the center or the hub of the rotation member and continues linearly, across the member passing to and coiling around the lower non-rotation member several times. The harness is then secured to the lower non-rotation member so that the wire of the harness retains its position. A roller or set of rollers or a diverter means is mounted on the rotation member so that the roller rides on the under side of the wire of the lower coil of the coils of wire around the upper non-rotation member and, when a second roller or diverter means is used, the second roller or diverter rides on the upper side of the wire of the upper coil of the coils of wire around the lower non-rotation member.

As the rotation member rotates, the rollers or diverters ride along the wire and divert the wire from one non-rotation member to the other non-rotation member through the opening in the rotation member.

Thus, the physical electric line which has flexibility, is diverted or deflected, linearly, from the non-rotation member, through or across the rotation member, to the second non-rotation member, running or transferring a linear portion of a coil of electric line from one plurality of coils of the same electric line to a second plurality of coils of the same electric line without interruption in the continuous characteristic of the line itself.

DETAILED DESCRIPTION OF THE INVENTION

Figure 1:
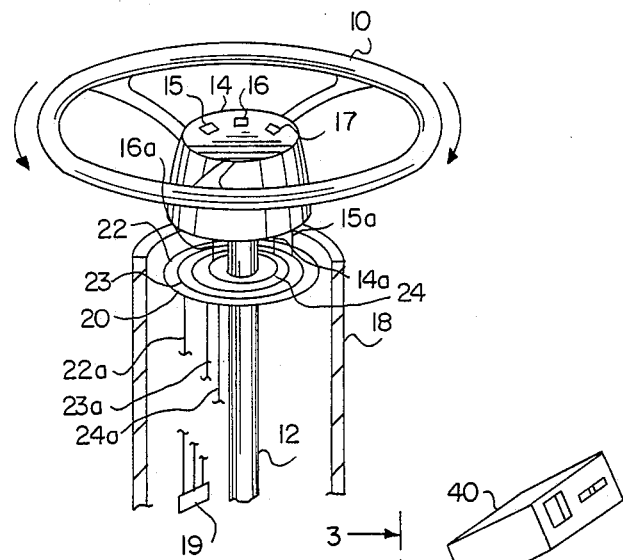
FIG. 1 is a representation of a motor vehicle steering wheel assembly where a prior art interconnect is employed.

FIG. 1 represents a steering wheel assembly with a prior art electrical interconnect for providing a continuous electrical path from a rotatable member to a non-rotatable member. A steering wheel 10 is represented having a direct coupling (not shown) to a steering shaft 12. The steering wheel has a hub 14 on which are located switches 15, 16 and 17. Around the steering shaft 12 is a cover 18 which represents a steering column. As is well known in the art, the steering column may include a decorative outer cover which is also functional. The outer cover may be used as a support and cover for mechanical and electrical links for hand controls such as turn indicator switches, headlight controls and other accessories on a motor vehicle.

In addition, the steering column is a fixed or stationary component through which the steering shaft, a rotatable member, passes. The steering column may include a terminal for hook-up of the electric lines from switches located in the hub of the steering wheel. It is well known that most motor vehicles use the body or chassis of the vehicle for a ground return for the electric system in the vehicle. Thus, only the positive side of electrical components are normally electrically connected by insulated lines or wires to the positive side of the power supply.

To each switch mounted in the hub is connected a conductive pin. Each pin may be mounted in the base of the steering wheel, for example and may extend toward a plate 20. The plate 20 may be mounted in or on the stationary steering column and thus becomes a stationary component. The plate includes three circular conductive tracks 22, 23 and 24 which electrically connect to the leads or wires 22a 23a and 24a.

The pins 14a, 15a and 16a make physical contact with the tracks on the plate and thus provide individual electric paths from the switches in the hub to the lower leads, which are connected to the terminal 19.

As the steering wheel is rotated the pins ride on the respective tracks making a mobile electric path.

It becomes apparent that this type of structure has inherent wear and is subjected to accumulation of dirt. The wear factor and dirt accumulation factor each present conditions of potential failure or breakdown.

Figure 2:
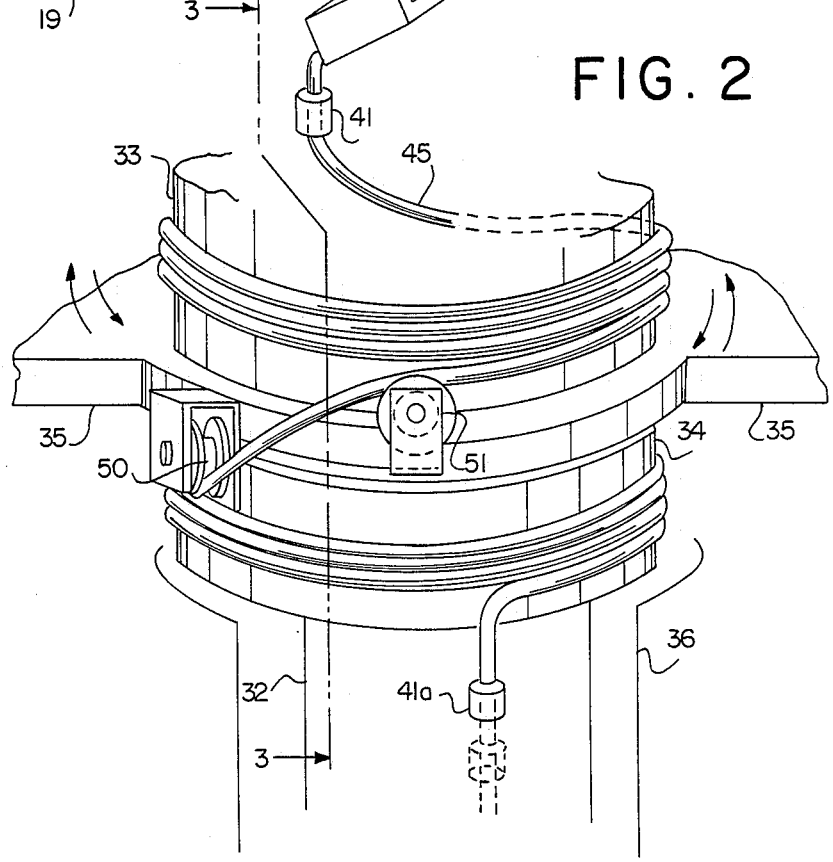
FIG. 2 is a representation of a preferred form of the present invention used on a motor vehicle steering assembly.
Figure 3:
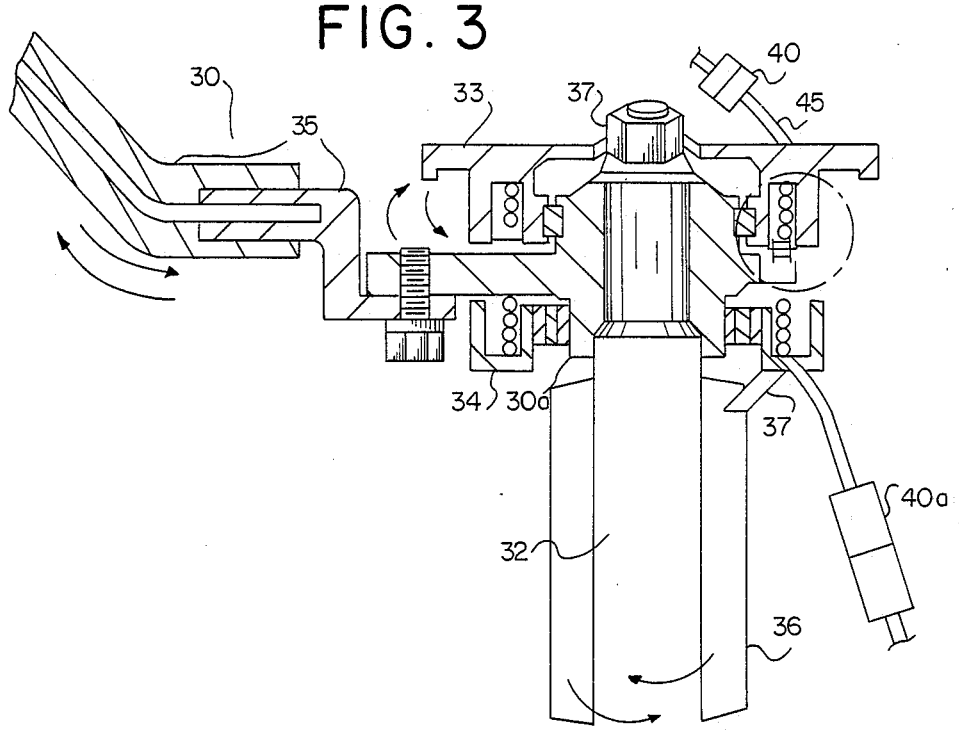
FIG. 3 is a cross sectional partial view of steering assembly using the present invention.
Figure 3A:
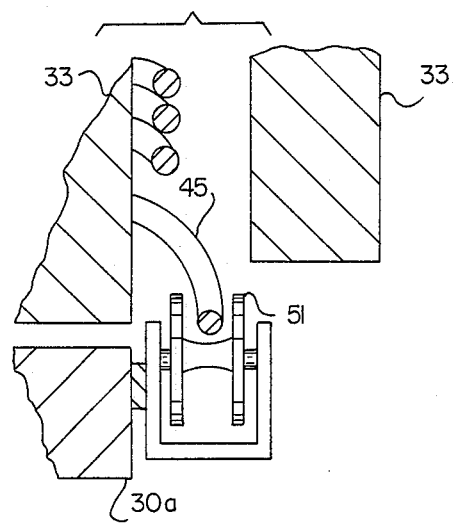
FIG. 3a is an enlarged section of the circled portion of FIG. 3.

A preferred embodiment of the present invention is illustrated in FIGS. 2, 3 and 3a, with common elements indicated with identical numbers. The example used for the present invention is use in a steering wheel assembly, of a motor vehicle, for example, however by describing the invention in such environment limitation to such use is not intended.

It should be kept in mind that the present invention finds utility in the environment of apparatus where a rotatable member having limited rotational travel is linearly positioned adjacent or between one or more non-rotating members, all members having substantially the same axis.

Attention is directed to FIGS. 2, 3 and 3a, where common elements are represented.

A steering wheel is represented, in part, at 30. It will be understood that a steering wheel may include two or more spokes, such as represented in FIG. 2 at 35. The steering wheel is coupled to the steering shaft 32 by a nut 37 screwed on to the end of the steering shaft. Thus coupled the steering wheel and steering shaft rotate in unison, forming a rotatable member.

Positioned at the center or hub of the steering wheel is a non-rotatable member which is mounted independently of the rotatable characteristics of the steering wheel. This non-rotatable member is represented at 33.

The upper non-rotatable member 33 is maintained in an essentially stationary or fixed position by apparatus (not shown) such as described and taught by U.S. Pat. No. 4,808,146. This apparatus also maintains the lower non-rotatable member 34 in a stationary or fixed position. Thus the environment in which the present invention is described includes a rotatable member 30/35/30a with non-rotatable member 33 and 34 axially positioned on either side of the rotatable member respectively.

An electrical connector 40 is represented at the end of a wire or cable 45. The cable 45 may be made up of one or more conductors and may be round or flat and preferably has a shield or casing of a plastic material so that the cable will slide freely against rollers or diverter means. The cable 45 is secured to the non-rotatable member at 41 so as to keep the cable in position around the non-rotatable member. The cable is coiled or looped about the non-rotatable member, the number of coils depending on the distance of rotational travel of the rotatable member 30.

The rotatable member includes a set of cable diverting elements such as rollers 50 and 51 secured in a mounting that is connected to the rotatable member and rotates therewith.

It will be apparent that elements other than rollers may be used to slide along the divert, or deflect the cable from one coiled location to another coiled location, the diverted cable running through a hole or opening in the rotatable member as the rotatable member rotates relative to the upper and lower coils.

The cable 45 is coiled around the exteriors of both the upper and the lower non-rotatable members, both coils being connected in a continuous line through a hole or opening in the rotatable member. The extremes of the cable are both secured so that the coils about the non-rotatable members will not disengage from the coiled position.

The rollers 50 and 51 are preferably positioned one slightly above the other and so that the top of the cable forming part of the upper coil of the lower set of coils rides on the bottom of the roller 50 and the bottom of the cable forming part of the bottom coil of the upper set of coils rides on the top of the roller 51. As the steering wheel or rotatable member is rotated the rollers roll along the cable and reposition or divert the cable, linearly, from one non-rotatable member to the other non-rotatable member through the opening of the rotatable member.

Displacement of the coils of the cable occurs across the rotatable member as the rotatable member is rotated.

The number of coils of wire or cable disposed around the upper non-rotatable member depends on the degrees of rotational travel of the rotatable member. For example, a steering wheel of a motor vehicle may travel some 1440 degrees or four full turns or rotations from one extreme position to the other. Thus, at least four loosely positioned coils are laid around the upper and the lower non-rotatable members.

As represented, the coils of the cable 45 may be covered, for protection and to avoid overlapping of individual coils.

As seen in FIG. 3, the lower non-rotatable member may be secured to the steering column 36 by a nut 37.

The end of the lower cable coils may be connected to an electric coupling, such as 40a or secured to the fixed steering column 36 at 41a.

It is assumed that the cross section of FIG. 3, is taken along line 3—3.

It will be appreciated that the function of the rollers 50 and 51 is to divert or deflect the cable or wire from one coiled location to a second coiled location, running the cable through a hole or opening in the rotating member as the rotating member rotates relative to the non-rotating coils.

Thus, the rollers or diverter means may take any of several forms. The diverter means are preferably rollers, as represented, but may take the form of pins or pegs or hooks or eyes mounted in or on the rotation member and positioned to divert, deflect or guide the cable or wire from one coiled position, around one non-rotation member, to a second coiled position, around a second non-rotation member, running through an opening or hole in the rotation member, as the rotation member rotates relative to the non-rotation members or non-rotating coils.

The diverting means may best include a smooth, slick or slippery surface along which the cable or wire may easily slide. This will reduce, to a minimum, any wear on the casing or cover of the cable or wire.

It is suggested that when practicing the invention care is taken to avoid overlapping of the coils as uniform stacking of the coils is preferred. However, the coils are preferably loosely stacked but snug around the non-rotating member.

It will be appreciated that the cable is displaced by a rotating element so as to be uncoiled and removed from one non-rotatable member and transferred and coiled on to a second non-rotatable member and in so doing, a continuous line or cable passes through a rotating member and avoids tightening and/or loosening around the rotational member.

It will be further appreciated that the invention provides a physically unbroken, continuous path which passes through a rotatable member that rotates substantially more than 360 degrees of rotation, without the need of an interconnect. It will be further appreciated that the cable or line so transferred may be an electric line or some other line, such as a liquid carrying line (conduit) or hose or a gaseous carrying line (conduit) or hose.

Although a preferred embodiment is represented with two cable diverting rollers it is apparent that the invention may be practiced using one roller or other cable displacing element.

Although a preferred embodiment of the invention has been represented and described and changes and alternatives have been suggested, other changes and modifications may be made, as will become apparent to those skilled in the art, without departing from the spirit of the invention as defined in the claims.

What is claimed is:

1. Apparatus for passing a conduit or cable from a stationary member through a rotatable member to a second stationary member without interrupting the continuity of said conduit, said apparatus comprising:
   (a) a first non-rotatable coil means of a continuous conduit or cable;
   (b) a second non-rotatable coil means of said continuous conduit or cable;
   (c) said first non-rotatable coil means and said second non-rotatable coil means connected linearly through a rotatable member, said rotatable member and said first non-rotatable coil means and said second non-rotatable coil means having substantially the same axis and
   (d) conduit or cable diverting means coupled to said rotatable member and rotatable therewith for diverting a portion of said first non-rotatable coil means through said rotatable member to said second non-rotatable coil means and for positioning said portion of said first non-rotatable coil means on said second non-rotatable coil means as said rotatable member rotates.

2. Apparatus as in claim 1 and in which said first non-rotatable coil means includes a plurality of coils.

3. Apparatus as in claim 1 and in which said first non-rotatable coil means includes a plurality of coils and said plurality of coils are coiled around a first non-rotatable member.

4. Apparatus as in claim 1 and in which said cable forms an electrical path.

5. Apparatus as in claim 4 and in which said first non-rotatable coil means has a first end and said first end is connected to a switch means.

6. Apparatus as in claim 3 and in which said first non-rotatable coil means has a first end and said first non-rotatable member includes a terminal coupled thereto and said first end is coupled to said terminal.

7. Apparatus as in claim 1 and in which said rotatable member includes an opening through which said first non-rotatable coil means and said second non-rotatable coil means are connected.

8. Apparatus as in claim 7 and in which said conduit or cable diverting means is mounted on said rotatable member at said opening for diverting said portion of said first non-rotatable coil means through said opening.

9. Apparatus as in claim 1 and in which said rotatable member is the steering wheel coupled to a steering shaft of a motor vehicle.

10. Apparatus as in claim 9 and in which said first non-rotatable coil means is a plurality of coils and said plurality of coils are coiled around a non-rotatable member positioned in a hub of said steering wheel.

11. Apparatus for passing a continuous cable from a first non-rotatable member through a rotatable member to a second non-rotatable member, said apparatus comprising:
   (a) a first portion of said continuous cable extending around said first non-rotatable member and forming a first coil of at least one full loop;
   (b) a second portion of said continuous cable extending around said second non-rotatable member and forming a second coil of at least one full loop;
   (c) said first non-rotatable member and said second non-rotatable member substantially axially aligned with each other and each substantially axially aligned with said rotatable member, said rotatable member including an opening in its axial direction;
   (d) a third portion of said continuous cable connecting said first portion and said second portion forming said continuous cable, said third portion passing through said opening in said rotatable member and
   (e) means coupled to said rotatable member for directing a part of said first coil through said opening when said rotatable member rotates for positioning a part of said third portion of said continuous cable on said second coil as said rotatable member rotates.

12. Apparatus as in claim 11 and in which said rotatable member is a steering wheel of a motor vehicle.

13. Apparatus as in claim 11 and in which said cable is part of an electric path.

14. Apparatus as in claim 11 and in which said first portion of said continuous cable is secured to said first non-rotatable member.

15. Apparatus as in claim 14 and in which said second portion of said continuous cable is secured to said second non-rotatable member.

16. A method of passing a continuous conduit secured at its extremes through a rotatable member including the steps of:
   (a) coiling a first portion of said continuous conduit about an axis of rotation of said rotatable member, the coils of said first portion stacked in a first series of loops on one side of a plane in which said rotatable member rotates;
   (b) coiling a second portion of said continuous conduit about said axis of rotation, the coils of said second portion stacked in a second series of loops on another side of said plane in which said rotatable member rotates;
   (c) connecting said first portion and said second portion through an opening in said rotatable member with a third portion of said continuous conduit, said third portion passing through said opening in said rotatable member; and
   (d) guiding part of said first portion of said continuous conduit from said one side into said opening and through said opening to said another side so that said third portion and part of said first portion join in a continuity of coils with said second portion as said rotatable member rotates.

17. A method as in claim 16 and in which step (d) includes the step of:
   diverting part of said first portion linerarly for replacing said third portion in said opening so that said third portion becomes part of the coils of said second portion as said rotatable member rotates.

18. A continuous electric conductor extending from a first stationary member, through a rotatable member, to a second stationary member without interrupting the continuity of said electric conductor, said conductor comprising:
   (a) a first non-rotatable coil means having a first end;
   (b) a second non-rotatable coil means having a second end;
   (c) said first non-rotatable coil means and said second non-rotatable coil means linearly connected through said rotatable member, said rotatable member and said first non-rotatable coil means and said second non-rotatable coil means having substantially the same axis; and,
   (d) means coupled to said rotatable member for diverting a portion of said first non-rotatable coil means through an opening in said rotatable member for repositioning said portion of said first non-rotatable coil means on to said second non-rotatable coil means in response to rotation of said rotatable member.

19. A continuous electric conductor as in claim 18 and in which said rotatable member is a steering wheel of a motor vehicle.

20. A continuous electric conductor as in claim 19 and in which said first end of said first non-rotatable coil means is secured to said first stationary member.

21. A continuous electric conductor as in claim 20 and in which said second end of said second non-rotatable coil means is secured to said second stationary member.

22. A continuous electric conductor as in claim 20 and in which said first non-rotatable coil means is coiled around said first stationary member.

23. A continuous electric conductor as in claim 20 and in which said first non-rotatable coil means is coiled around said first stationary member and said second non-rotatable coil means is coiled around said second stationary member.

24. A continuous electric conductor as in claim 21 and in which said first non-rotatable coil means is coiled around said first stationary member.

25. A continuous electric cable connected at one end to at least a switch in a hub of a steering wheel of a motor vehicle and passing through said steering wheel without physical interruption, said continuous cable comprising:
   (a) a first non-rotatable coil means having a first end connected to at least a switch in a hub of a steering wheel;
   (b) a second non-rotatable coil means having a second end;
   (c) said first non-rotatable coil means and said second non-rotatable coil means linearly connected through an opening in said steering wheel forming a continuous cable, said steering wheel and said first non-rotatable coil means and said second non-rotatable coil means having substantially the same axis.

26. A continuous electric cable as in claim 25 and further including, means coupled to said steering wheel adjacent said opening in said steering wheel for diverting a portion of said first non-rotatable coil means through said opening as said steering wheel rotates on it axis.

* * * * *